United States Patent [19]

McKeon

[11] 4,117,738
[45] Oct. 3, 1978

[54] CHAIN FOR ENGAGEMENT WITH DOUBLE SPROCKET

[75] Inventor: John F. McKeon, Carmel, Ind.

[73] Assignee: FMC Corporation, San Jose, Calif.

[21] Appl. No.: 738,499

[22] Filed: Nov. 3, 1976

[51] Int. Cl.² ............................................. F16H 57/04
[52] U.S. Cl. ................................ 74/250 R; 74/245 R
[58] Field of Search ................. 74/245 R, 250, 251, 74/252, 253, 229

[56] References Cited

U.S. PATENT DOCUMENTS

| | | | |
|---|---|---|---|
| 615,203 | 11/1898 | Woodcock | 74/250 |
| 690,317 | 12/1901 | Renold | 74/251.5 |
| 2,319,979 | 5/1943 | Collings et al. | 74/252 |
| 2,466,639 | 4/1949 | Focke et al. | 74/251 |
| 2,498,788 | 2/1950 | Bremer | 74/250 |
| 2,844,042 | 7/1958 | Mercier | 74/245 |

Primary Examiner—Benjamin W. Wyche
Assistant Examiner—Wesley S. Ratliff, Jr.
Attorney, Agent, or Firm—J. F. Verhoeven

[57] ABSTRACT

A chain for engagement with a double sprocket has alternate pin links and center, or bushing, links. The bushing links comprise a single center bar with two laterally extending bushings tightly received therein. The pin links have side bars parallel to the center bars, and the side bars are connected together by laterally extending pins. The pins of each pin link are rotatably received in the near bushings of each of the adjacent bushing links. Rollers are received on each bushing, on each side of the center bar, to define pockets with the side bars and center bars, on each side of the center bars, to receive the teeth of a double sprocket.

4 Claims, 3 Drawing Figures

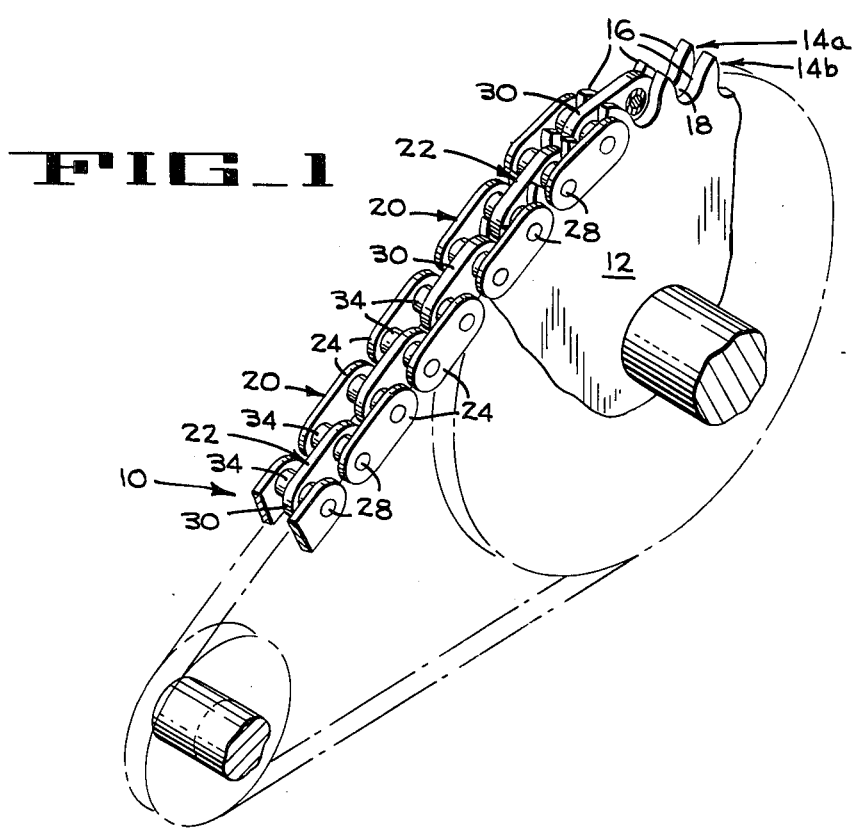
FIG_1
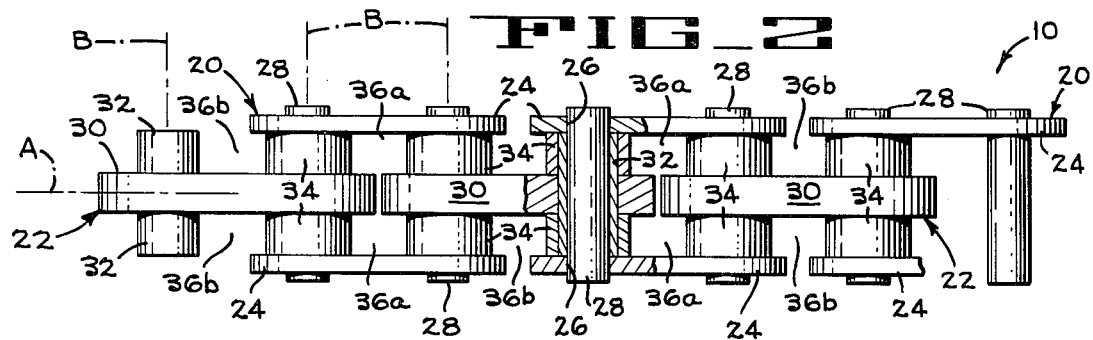
FIG_2
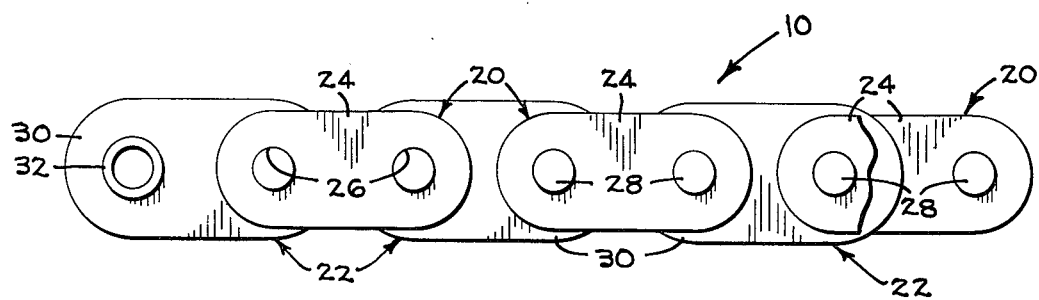
FIG_3

CHAIN FOR ENGAGEMENT WITH DOUBLE SPROCKET

BACKGROUND OF THE INVENTION

1. Field of the Invention

The present invention relates to chain, and, more particularly, to chain suitable for engagement with a multiple sprocket.

2. Description of the Prior Art

Multiple strand chain has been used heretofore where additional strength is needed, as demonstrated by the teachings of Weiss in U.S. Pat. No. 2,212,907 and of Focke et al in U.S. Pat. No. 2,466,639. In the usual multiple-strand chain (which is used in conjunction with a multiple tooth sprocket), a plurality of single strand chain structures are mounted, side-by-side, on elongated pins to form the multiple-strand chain. In other words, each half of a conventional double strand chain has pin links alternating with bushing links so that each link on one-half of the chain is duplicated in the other half of the chain. In a double strand chain more power can be transmitted by the chain since the power is delivered simultaneously to two side-by-side portions of the chain by two sprocket teeth.

The usual side-by-side duplicate construction of a multiple-strand chain makes it costly to utilize this type of chain, with the result that it is not economically feasible to use a conventional multiple-strand chain in every instance where greater chain strength is needed.

SUMMARY OF THE INVENTION

I have provided a chain to which power can be delivered to, and taken from, two side-by-side portions simultaneously through sprockets with double teeth. My chain has alternately arrayed pin links and center links. The center links, which may, for example, comprise single bars, are in spaced end-to-end relation. The pin links have side bars parallel to the center links, and the side bars are connected together by laterally extending pins. The pins of each pin link extend, respectively, through the near end of each adjacent center link for pivotal connections to the center links. The center links and side bars define pockets between the pins of each pin link, on both sides of the center links, to receive two sprocket teeth simultaneously.

Preferably, bushings are secured in the center bars to rotatably receive the pins of the pin links, and rollers are received on the bushings. For added strength, I prefer to weld the ends of the pins into the pin link side bars.

It is therefore one object of the present invention to provide a low cost chain which can be used in conjunction with a double sprocket.

It is another object of the present invention to provide a chain which can receive power from a double sprocket at two laterally spaced portions simultaneously.

It is yet another advantage of the present invention that the center link can be held in a centered position so that it will not come off the bushings into engagement with the side bars.

BRIEF DESCRIPTION OF THE DRAWINGS

FIG. 1 is a fragmentary view in perspective of the chain of the present invention received on a double sprocket.

FIG. 2 is a plan view, with parts broken away, of a section of the chain of the present invention.

FIG. 3 is a side view of the chain of FIG. 2.

DESCRIPTION OF THE PREFERRED EMBODIMENT

There is shown in FIG. 1, a chain 10 mounted on a sprocket 12. The sprocket 12 is a conventional double sprocket having two rows 14a and 14b of identical sprocket teeth 16. The teeth in one row are spaced apart from the corresponding teeth in the adjacent row to define a gap 18 therebetween.

The chain 10 is shown best in FIGS. 2 and 3. The chain is made up of alternate pin links 20 and center, or bushing, links 22.

Each pin link 20 has a pair of side bars 24 parallel to a central longitudinal axis A of the chain. The section of chain shown has pitch axes B, normal to the longitudinal axis A, and each pin link side bar 24 has a circular opening 26 at each end on a pitch axis. A pair of laterally extending pins 28, on two adjacent pitch axes, are received in and extend through the openings 26. The pins are welded in the openings 26 to securely hold the side bars 24 in parallel, spaced apart relation. Thus, the two pins 28 and the two side bars 24 form a pin link 20.

The center links 22 each have a center bar 30, which is preferably a single unitary member. The center bar lies in axis A, and a bushing 32 is secured in the center bar at each end. The bushings 32 in each center bar 30 lie on pitch axes B, and extend outwardly equally on each side of the center bar. Thus, the center bar 30 and the two bushings 32 form a center, or bushing, link 22.

The pin links 20 and center links 22 are pivotally connected together, in an alternating sequence, by the receipt of each pin 28 in the near bushing 32 of the adjacent center links. It will be noted that each bushing 32 terminates short of the side bars 24 on each side of the center bar 30.

A roller 34 is received on each end of each bushing 32 between the center bar 30 and the side bar 24. It should be noted that the center bars 30 are closely spaced apart in end-to-end relation so that a pocket 36a is defined, on each side of the center bars, by the side bar 24, the rollers 34, and the ends of the center bars. A similar pocket 36b is defined, on each side of the center bars, by the center bar 30, the rollers 34, and the closely spaced ends of the side bars 24. The pairs of pockets 36a are alternately arranged with the pairs of pockets 36b in the chain.

When the chain 10 engages with the sprocket 12, the teeth 16 of rows 14a, 14b on the sprocket are received, respectively, in the pockets of the chain. The center bars 30 are received in the gap 18 between the two rows of teeth. Thus, power is transferred between the sprocket and the chain at two locations, one on each side of the center bars, as the sprocket teeth 16 simultaneously engage the rollers 34 in pockets 36a or 36b.

Thus, a strong, simple, low cost chain, without a side-by-side duplication of links, has been provided to take power from, and deliver power to, a double sprocket.

Although the best mode contemplated for carrying out the present invention has been herein shown and described, it will be apparent that modification and variation may be made without departing from what is regarded to be the subject matter of the invention.

What is claimed is:

1. A chain for engagement with a double sprocket comprising in combination a plurality of pin links, each having a pair of laterally spaced longitudinally extending side bars and a pair of longitudinally spaced laterally extending pins between and connecting said side bars, a plurality of center links each having a center bar provided with longitudinally spaced apertures receiving said pins therethrough, said center bars disposed between said side bar pairs and parallel thereto in laterally spaced relation thereto, said center bars alternately arranged with respect to said pin links each so that each center bar between adjacent pairs of pin links receives a pin of one pin link pair through one center bar aperture and receives a pin of the other pin link pair longitudinally adjacent thereto through the other center bar aperture, said adjacent center bars having a closely spaced end-to-end non-overlapping relationship to each other with adjacent ends of each two bars disposed between a single pair of pin link side bars, and, said side bars of adjacent pin links having a closely spaced end-to-end relationship with each other, thereby defining pockets for cooperation with said sprocket between each side bar and the ends of a laterally adjacent pair of end-to-end center bars, and between each center bar and the ends of a laterally adjacent pair of end-to-end side bars.

2. The chain of claim 1 wherein said center link, in addition to said center bar, further includes bushings carried thereby for reception about said pins.

3. The chain of claim 2 further including rollers rotatably carried by said bushings for engagement with said sprocket.

4. The chain of claim 1 in which the pins are welded to the side bars.

* * * * *